TRANSISTORIZED SUPERVISORY CIRCUIT FOR TRANSMISSION LINES

Filed June 2, 1960

*Inventor*

E.Cohrt - J.E.B. Scavenius

By Paul W. Hemminger

Agent

United States Patent Office 3,133,275
Patented May 12, 1964

3,133,275

TRANSISTORIZED SUPERVISORY CIRCUIT FOR TRANSMISSION LINES

Eigil Cohrt and Jens Erik Brønnum Scavenius, Copenhagen, Denmark, assignors to International Standard Electric Corporation, New York, N.Y., a corporation of Delaware Filed June 2, 1960, Ser. No. 33,442
3 Claims. (Cl. 340—253)

Figure 1:
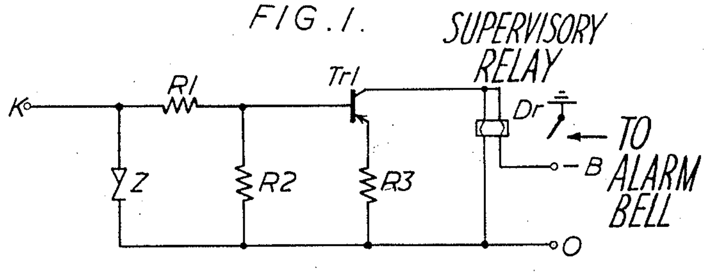

This invention relates in general to a transistorized supervisory circuit and in particular to a circuit for supervising the continuity of communication lines. Its principal object is to provide a circuit of the above character which is economical in manufacture yet reliable in operation.

In communication systems, it is desirable to continually supervise certain lines interconnecting two or more exchanges in order to detect lack of continuity therebetween. When the continuity is destroyed an alarm indication is given and the line is blocked against further use.

In conventional systems employing two-wire inter-exchange lines or trunks, battery and ground potentials are applied to respective wires of the line through respective windings of a two-winding line relay in the main exchange. When the line wires are bridged by dialing contacts or similar equipment at the sub-exchange, a loop is completed between the battery and ground supply and the line relay is operated. Thereafter a call or other control is carried out in a well-known manner.

In systems of the above character, wherein control is initiated in the sub-exchange, it is customary to provide a high-ohmic relay in series with the line to handle calls. The current flowing through the resulting loop circuit is sufficient to operate the high-ohmic relay but insufficient to operate the line relay. Thus, the operated condition of the high-ohmic relay is indicative of the continuity of the associated line.

In many instances, the interconnecting line may be used for two-way service and it is desirable to have a supervisory relay at each exchange. In such instances, a high-ohmic relay is inserted at each exchange in the same loop circuit. The resulting operation of both high ohmic relays provides each exchange with an indication of the condition of the line. As is the case with a one-way line, the current flowing in the loop circuit of a two-way line operates both high-ohmic relays but does not operate the line relay. When a call is initiated, the high-ohmic relay at the calling exchange is short-circuited, as by dial contacts, causing an increase in the amount of loop current, which increased current operates the line relay at the called exchange.

A problem exists in the above two-way supervisory system in that the variation in loop current as a result of the short circuiting of one high-ohmic relay is small and an extremely sensitive line relay must be provided. However, such sensitive relays are subject to line leakages and varying line resistances and are generally not acceptable.

According to the present invention, the foregoing disadvantage is overcome by providing a transistorized coupling circuit which varies in resistance in accordance with the voltage impressed thereacross. Thus, when the high-ohmic relay at the calling exchange is short-circuited, the voltage appearing across the equivalent high-ohmic coupling causes such coupling to alter its resistance sufficiently to increase the line current to a value sufficient to operate a standard line relay.

The described supervisory coupling comprises a supervisory relay transistor, and Zener diode in circuit therewith. The resistance of the base-emitter circuit of the transistor serves as a high-ohmic loop resistance when the line is not calling and the transistor current maintains the supervisory relay operated. The Zener diode is bridged across the base-emitter circuit of the transistor and when the high ohmic relay in the distant exchange is short-circuited, the Zener diode breaks down from the increased voltage and presents a low resistance to the loop circuit which permits operation of the line relay in a conventional manner. The supervisory relay remains operated during this short-circuiting operation from the transistor current.

The supervisory relay is a differential relay whose two windings are connected in series with one another via the supply potential source.

Figure 2:
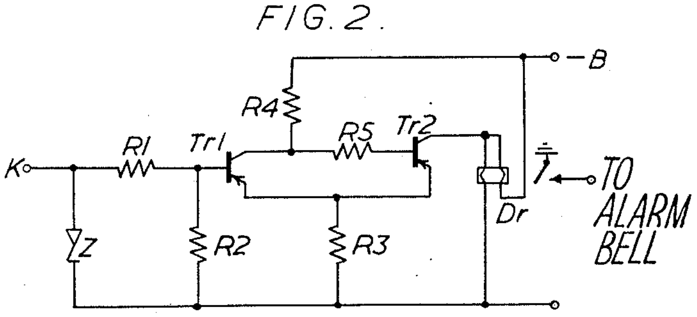
Figure 3:
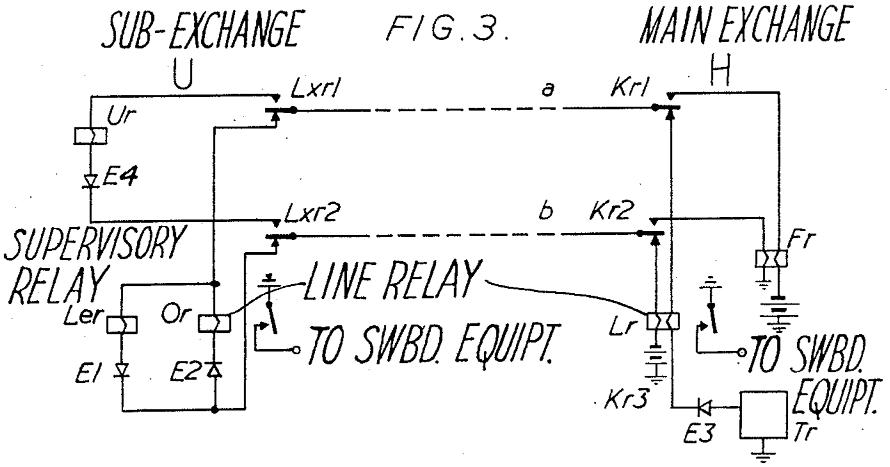

The invention will be better understood from the following description referring to the drawing on which:

FIGS. 1 and 2 show their respective embodiment of the supervisory transistor relay coupling according to the invention, and FIG. 3 an embodiment of the trunk circuit according to the invention.

In the coupling shown in FIG. 1, input terminal K is connected to the positive side of a Zener diode Z, and through a protective resistance R1 to the base of transistor Tr1. A leakage resistance R2 is connected between the base of the transistor and ground. The negative side of the Zener diode Z is connected directly to ground while the emitter of transistor Tr1 is connected to ground through resistance R3. The two windings of a differential relay Dr are connected in series between the negative pole —B of a power source and ground, and the junction point between the two windings is connected to the collector of the transistor.

When the control voltage supplied to the input terminal K is zero no current passes through the transistor Tr1, and the two windings of the differential relay Dr then carry the same current. That is, the flux produced by the two windings are in opposing relationship, thus maintaining relay Dr unoperated. When a negative control voltage appears on terminal K the current in the emitter-base circuit of the transistor increases, resulting in an increasing current in the emitter collector circuit. At this time, the current through one relay winding increases sufficiently to unbalance the opposing flux and operate relay Dr. The ampere turns on the relay windings are such that the relay operates before the control potential across the input circuit of the transistor reaches the Zener potential of the Zener diode Z, and therefore, only a supervisory current passes through the diode. However, by continuous increase of value of the control voltage the Zener voltage is reached and the potential across the input circuit of the coupling is maintained constant. Thus the current in the transistor will keep constant independently of the incoming control potential. Thus, when the control voltage has reached the Zener voltage the coupling has an impedance inversely proportional to the control current.

The embodiment shown in FIG. 2 differs from that shown in FIG. 1 in that two transistors Tr1 and Tr2 are provided and connected to form a mono-stable multivibrator. The input circuit of this coupling, which includes the input transistor Tr1, is arranged in the same manner as in FIG. 1, and corresponding portions of said two figures are provided wtih the same references. In FIG. 2, the emitter resistance R3 is common to both transistors and the collector of transistor Tr1 is connected through resistance R4 to the negative pole of the power source and through resistance R5 to the base of the output transistor Tr2. The output circuit of the coupling, which comprises the differential relay Dr, is the same as that shown in FIG. 1, the connecting point of the two windings being connected to the collector of the transistor Tr2.

When the control voltage on the terminal K is zero, the transistor Tr1 is blocked and the transistor Tr2 is conductive and relay Dr operates. When the control voltage reaches a negative value sufficiently to cause Tr1 to conduct by overcoming the bias produced by the emitter current in Tr2 across the common emitter resistance R3, transistor Tr2 is immediately blocked, and relay Dr is released. The Zener diode Z has the same effect as explained above in connection with FIG. 1.

A practical application of the junction circuit is shown in FIG. 3. A trunk line consisting of a balanced pair of wires *a* and *b* interconnects main exchange H with sub-exchange U. As shown, no calls are in progress and a supervisory current flows over a path including battery, one winding of line relay Lr, contacts Kr2 of relay Kr (not shown), wire *b*, contacts Lxr2 of relay Lxr (not shown), rectifier E1, supervisory relay Ler, contacts Lxr1 of relay Lxr, wire *a*, contacts Kr1 of relay Kr, the other winding of line relay Lr, rectifier E3 and the input circuit of transistor relay coupling TR. Coupling TR is similar to that shown in FIG. 1 or 2. Supervisory relay Ler is a high ohmic relay which is maintained operated by the supervisory current, whereas the line relay Lr is a low ohmic relay which is not operated from the supervisory current. However, this current is sufficient to operate transistor relay DR in exchange H. If the supervisory current is interrupted from a line breakage interruption relay Ler and coupling TR release and provide an alarm.

Under normal operation on a call from exchange U, contacts Lxr1 and Lxr2 are switched, and the low ohmic relay UR is connected in series with a rectifier E4 while relay Ler and associated rectifier E1 are disabled. This reduces the resistance in the loop and causes relay Lr in the main exchange to operate. The drop of potential across the input circuit of the transistor relay coupling TR across the Zener diode results in coupling having a comparatively low impedance. The line relay Lr functions in the main exchange H in the usual manner to complete the call.

On a call from exchange H contacts Krl1 and Kr2 are switched and the line is transferred from line relay Lr to feeding relay Fr. By this switching, the polarity on wires *a* and *b* is reversed so that the supervisory relay Ler in the subexchange is released, and line relay Or is operated through rectifier E2. Thereafter, the functions in the sub-exchange necessary for the handling of the call are completed in a known manner.

In the sub-exchange U, a short-circuit of the line has the same effect as an interruption in that the supervisory relay Ler is released and blocks the line, because the current supply source is provided in the main exchange.

In the exchange H, a line short-circuit will have the same effect as a call from the sub-exchange, in that the line relay Lr operates and a timing circuit (not shown) causes blocking of the line. An alarm will be given, if signalling from the sub-exchange is not commenced in a predetermined time.

From the foregoing it can be seen that full supervision of the line is obtained from either exchange and that remote blocking by interruption of the line circuit is accomplished.

The invention is not limited to the special embodiments described above and shown on the drawing, as these embodiments may be varied in many ways within the scope of the invention.

We claim:

1. In a supervisory system for supervising the continuity of a transmission line, a two winding relay, a power source, means for connecting the said windings in series and in flux opposing relationship across said source, switching means having an input circuit connected to said line and having an output circuit connected to the junction between said series windings, said switching means comprising a transistor having base, emitter and collector electrodes with the said base and emitter electrodes included in said input circuit and with the said collector and emitter electrodes included in said output circuit, means responsive to the continuity and non-continuity of said line for respectively operating and restoring said switching means, means in the said output circuit for controlling the quantity of flux generated by each said relay winding to cause an unbalance of flux whereby the resultant generated flux operates said relay when said switching means is operated and restores said relay when said switching means is unoperated, and means controlled by said relay for indicating the continuity condition of said line.

2. A supervisory system as set forth in claim 1, wherein said input circuit includes a shunt comprising a constant voltage device.

3. A supervisory system as set forth in claim 1, wherein said switching means includes another transistor, said transistor being interconnected to form a monostable multivibrator which is switched from its stable state in response to non-continuity of said line.

References Cited in the file of this patent

UNITED STATES PATENTS

| | | |
|---|---|---|
| 2,275,126 | Bonorden | Mar. 3, 1942 |
| 2,356,296 | Zinn | Aug. 22, 1944 |
| 2,807,009 | Rowell | Sept. 17, 1957 |

FOREIGN PATENTS

| | | |
|---|---|---|
| 221,282 | Great Britain | Sept. 9, 1924 |